Feb. 23, 1926.

J. A. STOBIE

BALING PRESS

Filed April 20, 1921

Inventor
John A. Stobie
by Helge Murray
his Attorney

Feb. 23, 1926.  
J. A. STOBIE  
BALING PRESS  
Filed April 20, 1921  
1,574,263  
5 Sheets-Sheet 4

Patented Feb. 23, 1926.

1,574,263

UNITED STATES PATENT OFFICE.

JOHN A. STOBIE, OF MALTA BEND, MISSOURI.

BALING PRESS.

Application filed April 20, 1921. Serial No. 463,093.

*To all whom it may concern:*

Be it known that I, JOHN A. STOBIE, a citizen of the United States, residing at Malta Bend, in the county of Saline and State of Missouri, have invented certain new and useful Improvements in Baling Presses, of which the following is a specification.

This invention relates to baling presses and more particularly stated contemplates the production of automatically controlled mechanism for baling and tying hay and other materials.

An object of the present invention is to produce an automatic baler wherein the material is formed into successive units or bales without the interpositioning of blocks or similar separating devices, each bale being secured by a relatively loose wire applied threto in the form of a loop, one side of the loop constituting one half of the wire used in the preceding formed bale, and the other side of the loop forming one half of the wire used in the succeeding bale to be formed.

Another object of the invention is the production of means for laying the wire in the form of a loop, and clamping one side thereof, the other side of said loop being laid substantialy parallel with the end of the wire positioned around the front end of the bale being tied, for purposes of twisting the parallel portions together and subsequently cutting.

A further object of the invention is to produce an automatic baler having a tying device arranged to operate intermediate the ends of the bale and spaced from the sides of the press, so that the connecting knot or twist in the wire is upon the side of the bale, and a relative looseness or slack in the wire is provided to permit of an appropriate expansion of the hay after the compressing operation without danger of the baling wire breaking, as is now frequently the case.

A still further object of the invention is to provide a baling press including means for automatically operating the wire laying device, the timing of said means being determined by the successive passing of the formed and tied bales over an actuating or setting device, the later being subsequently operated by the baling plunger; means operably controlled by the wire laying device for effecting the operation of the wire tying or twisting device, and a cutting mechanism the operation of which is controlled by the said tying device.

With these and other objects in view the invention further consists in the novel construction and arrangement of the several parts hereinafter described and pointed out in the appended claims.

In the accompanying drawings:—

The present invention comprises among other things, a baling chamber and material compressing plunger; an automatic wire laying device interconnected with the press and intermittently operated after the compressing of sufficient material to form a bale, and upon the ejection of the previously tied bale; a wire tying mechanism interconnected with the press and intermittently actuated by the wire laying device after it has made a loop and returned to its initial position; and a wire cutting device adapted to cut the extending ends of the wire upon each side of the tied or twisted joint.

Figures 1, 15:
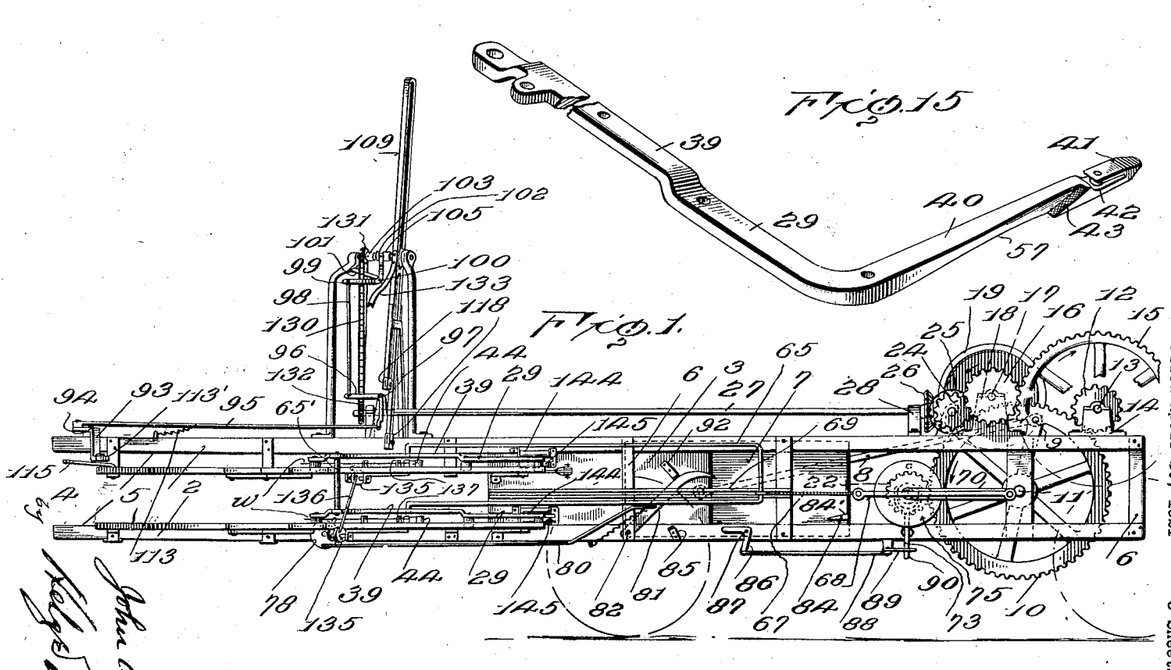
Fig. 1 is a view in side elevation of my improved automatic baling press.
Fig. 15 is a detail perspective view of the wire laying needle-bar.

Referring to the drawings in which similar reference characters designate corresponding parts in the several views, the baling chamber 1 of the press is formed by the corner angle members 2 and plates 3 secured thereto to form the walls of the chamber. The top and bottom plates 3 extend considerably beyond the baling chamber 1 and together with the projecting angle members 2 form a relatively long discharge end 4 through which abutting or tied bales of material are successively fed. It is the bulk or weight of these tied bales which constitutes the movable abutment against which the material forming the bale is compressed by the reciprocating plunger. The side walls of the discharge end 4 are preferably open as at 5, the wall plates 3 extending far enough to form the baling chamber and terminating short of the end of the top and bottom plates and the angle members 2 as best shown in Fig. 1. Connecting bars 6 are provided between the angle members and these together with such other bracing devices as may be required serve to produce a relatively light but at the same time durable frame structure.

A baling or compressing plunger 7 is mounted to reciprocate preferably in the guideways formed by the angle members 2, and a pitman 8 connects the plunger to the operating or driving mechanism now to be described.

The pitman is connected by a pin 9 which latter secures similar and relative large gears 10 for rotation together upon a shaft 11. Pinions 12 mounted upon the shaft 13 are designed to mesh with the large gears 10. The shaft 13 is supported in bearings 14 secured to the angle bars 2, and has secured to one end thereof a relatively large gear 15. A pinion 16 meshes with the large gear 15, said pinion being secured to the driving or main shaft 17 which latter is supported in bearings 18. The shaft 17 preferably carries a fly wheel 19, and a driving pulley 20 is mounted adjacent said fly wheel, (see Fig. 2). Power may be transmitted to the pulley by means of the belt 21 from any suitable source, or if desired an engine may be carried by the baler and directly connected to the driving mechanism. It will be understood that various changes in the arrangement and construction of this driving mechanism may be made, and likewise other usual associated devices such for example as the feeding-in plunger (not shown) may be interconnected therewith.

The wire laying device and the tying mechanism are both operated from the driving means of the baler, the former deriving power through the pinion 22 loosely carried by the shaft 23 meshing with one of the large gears 10, and the latter being driven by a pinion 24 meshing with one of the large gears 10. A bevel gear 25 is carried by the pinion 24 and is designed to mesh with the bevel gear 26. The bevel gear 26 is secured to a longitudinally disposed shaft 27, mounted in bearings 28 extending from one of the angle bars 2. Power is transmitted from the shaft 27 to the tying mechanism to be presently described.

The wire laying device is best illustrated in Figs. 1, 2, 3 and 4 and includes a movable needle-bar 29 operably mounted in a series of tracks or guideways 30, 31 and 32. Rollers 33, 34 and 35 carried by the underside of the needle-bar are arranged to move in the aforesaid respective tracks, and facilitate the free and easy movement of said needle-bar during the wire laying operation.

There are substantially three distinct paths of travel imparted to the needle-bar by the aforesaid tracks or guideways, the same being a straight or parallel movement of the needle-bar when bringing one side of the wire loop parallel with the previously clamped end of the wire (see Fig. 4); an angular or deflected movement of the needle-bar as it lifts one of the clamping studs and inserts the other side of the wire loop under a lip and between the abutted holding studs to be presently described (see Fig. 4); and the transverse movement of the needle through the baling chamber to the other side thereof for engaging the wire as it is fed from the spool or reel support, and in so doing form the loop indicated by the character L.

Figures 4, 5:
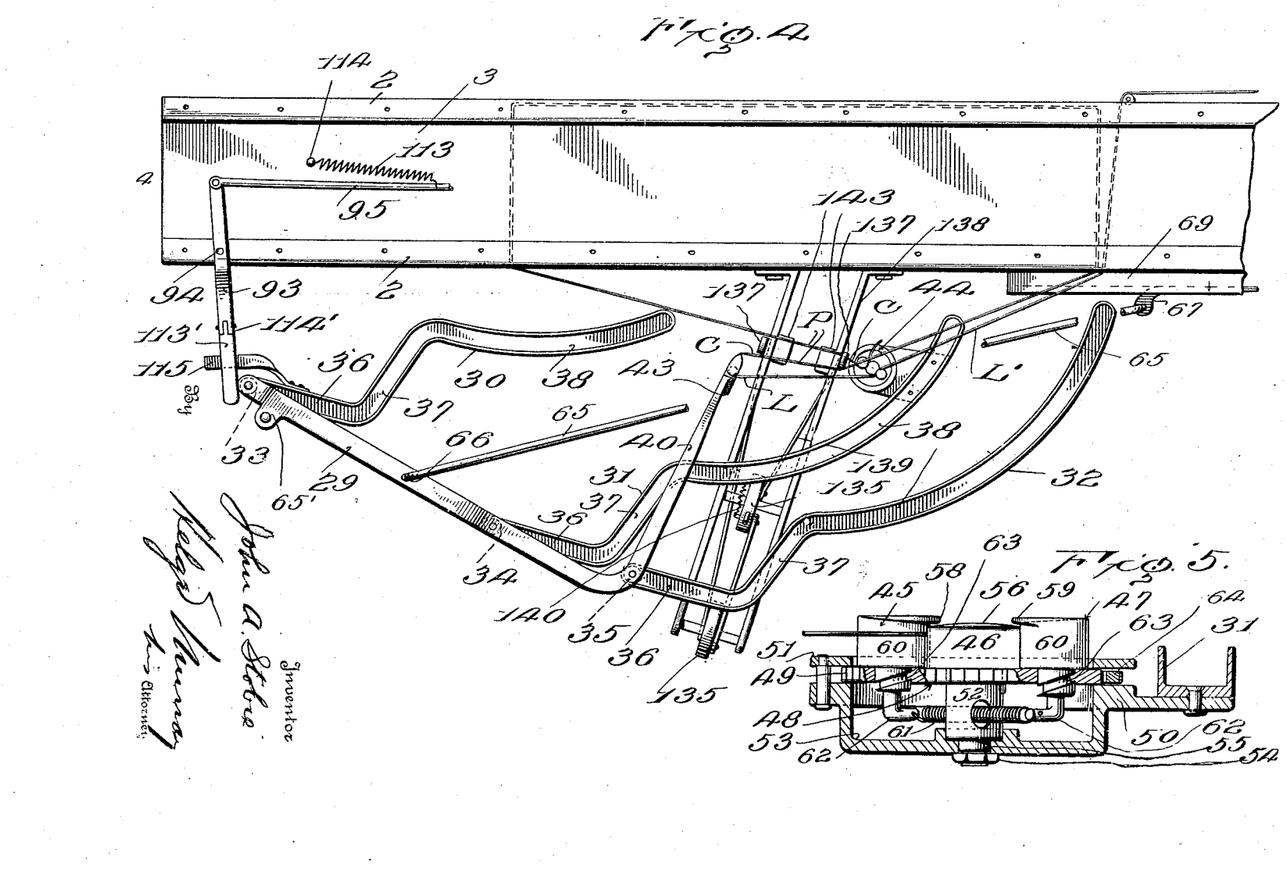
Fig. 4 is a fragmentary plan view of the front portion of the press showing the wire carrying needle and associated parts.
Fig. 5 is an enlarged sectional elevation through the holding studs of the wire clamping device.

The respective portions of the tracks which provide for the straight or parallel movement of the needle bar are indicated by the numeral 36; the angular or deflected movement of the needle bar being obtained through the respective offset portions 37; and the transverse movement of the needle bar through the baling chamber being achieved by the respective curved portions 38.

The needle bar 29 is angular in shape, having the arms 39 and 40. A wire engaging end 41 is provided on the arm 40, a pin and groove 42 serving to hold and retain the wire in position during the wire laying or threading operation. Formed adjacent the pin and groove 42 is a cam or beveled surface 43. The lower portion of the cam forms a relatively thin edge adapted to cooperate with a lip provided on the holding studs of the wire clamping or securing device 44 now to be described.

Figure 3:
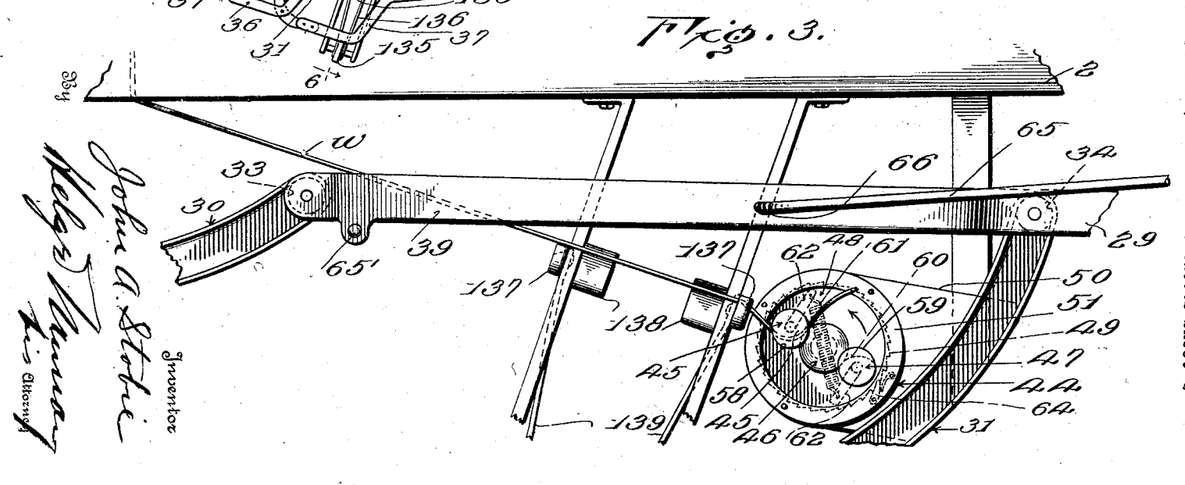
Fig. 3 is a detail plan view on an enlarged scale of a portion of the wire laying needle and the associated wire clamping device.

Referring particularly to Figs. 3 and 5, the wire clamping device 44 comprises three diametrically alined studs 45, 46 and 47. The studs are supported upon a disc or circular plate 48 the periphery of which is provided with ratchet teeth 49. A supporting bracket 50 is secured to and extends from the track 31, and a retaining ring 51 serves to hold the plate 48 thereon for rotation between said bracket and ring.

The centrally positioned stud 46 is secured to the plate 48, and is provided with a depending shank 52 revolubly supported in a yoke 53 extending from the bracket 50. A nut 54 threaded on the reduced end 55 of the shank 52 serves to hold the stud in position. The head of the stud is relatively large and the top face thereof may be slightly curved as indicated at 56. The underside of the needle bar may be also slightly curved as indicated at 57 (see Fig. 15) for co-action with the curved portion 56 of the stud, thereby facilitating the engagement of the thin edge of the cam 43 under the lips 58 and 59 of the respective studs 45 and 47.

Each stud 45 and 47 is provided with a head or wire holding portion 60 eccentrically or cam shaped to permit its engagement with the head portion of the central stud 46. The engaging surfaces of the eccentric or cam portions 60 are arranged to bear against the head of the center stud in opposite relation, one toward the other, and a spring 61 passing through an opening in the shank 52 of said stud 46 connects the projecting pins 62 of the studs 45 and 47 for holding the cam portion 60 of each stud against the head of the center stud 46.

The studs 45 and 47 are independently movable in rotary and vertical directions, a relatively steep thread and cooperating pin 63 serving to rapidly elevate the stud and the lip carried thereby when the cam 43 moves against and under the said lip to rotate the stud against the tension of the spring 61.

When the needle bar moves across the top surface of the stud 46 with the wire loop positioned in the end of said needle bar, the edge of the incline or cam 43 moves under the lip 59 of the stud 47, causing the stud to rotate, and by reason of such rotation, to rise sufficiently to press one side of the wire loop under the lip and downwardly between the head of the center stud 46 and the cam or eccentric portion 60 of the stud 47. As the needle moves through and off of the stud 46 and from under the lip 59 the wire is drawn downwardly between the aforesaid studs and the spring 61 reverses the direction of rotation of the stud 47 thereby lowering the same to its initial position. The continued movement of the needle bar carries the wire loop beyond the wire clamping device and lays the opposite unclamped side of said loop substantially parallel with the previously clamped wire end for tying or twisting. During this movement the clamped side of the wire loop can be drawn through or between said studs 46 and 47 as will be understood.

When the ends of the wire have been tied and cut, the side of the wire loop just described as laid between the clamping studs 46 and 47 remains between the said studs and serves to rotate the clamping device 44 in the direction of the arrow shown in Fig. 3 as will now be explained.

Figures 10, 11, 12, 13, 14:
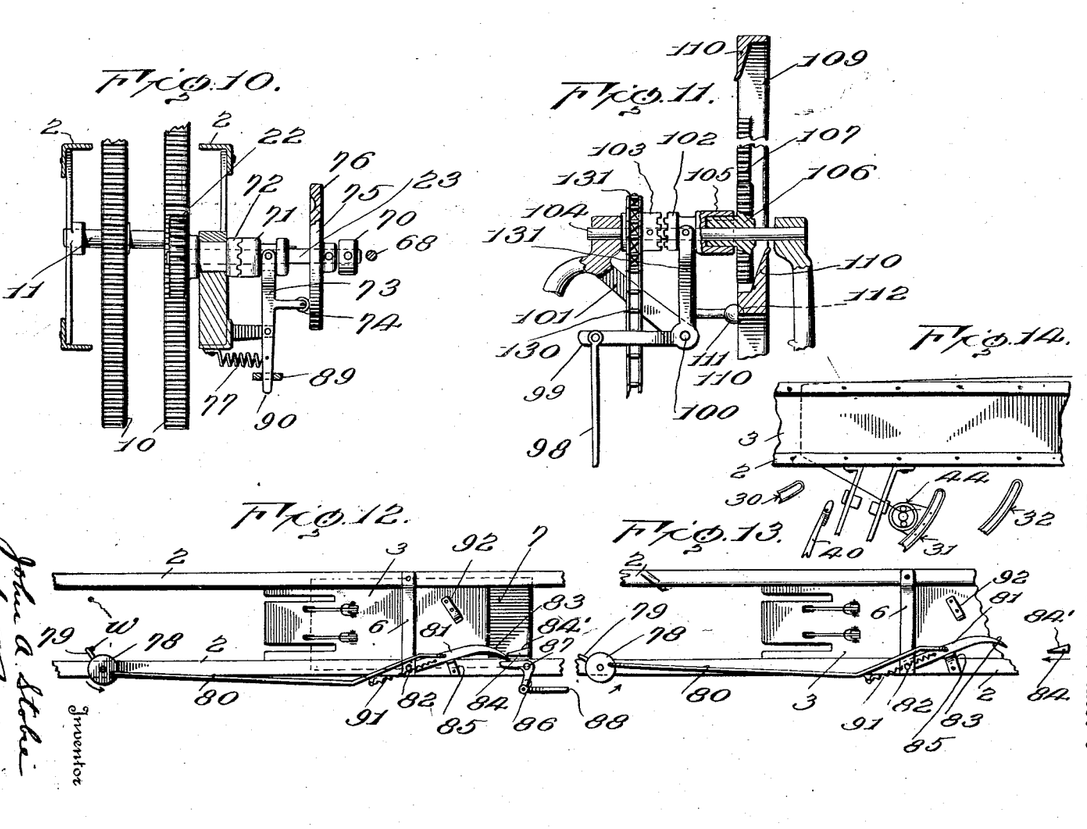
Fig. 10 is a fragmentary sectional view illustrating the clutch mechanism arranged between the operating gears of the press and the automatically controlled wire laying device.
Fig. 11 is a detail view showing the clutch mechanism for controlling the intermittent operation of the wire tying or twisting device.
Fig. 12 is a fragmentary view in elevation, illustrating the mechanism which is set by the wire of the preceding formed and tied bale as it passes out through the discharge end of the press.
Fig. 13 is a similar view showing the position of the aforesaid setting mechanism ready for actuation by the cam element carried by the baling plunger.
Fig. 14 is a detail fragmentary plan view showing an intermediate position of the wire clamping device as it is being swung around by the pressure of the hay against the wire.

The side of the wire loop clamped in the studs is indicated by the numeral L′, and as shown in Fig. 4 constitutes the free end of the wire as it has been drawn through the baling chamber from the wire spool or reel. This portion L′ of the wire loop is in advance of the material being deposited in the baling chamber, and forms the front end of the tying wire for the bale. As the material is compressed by the plunger against the previously formed bale the wire L′ is carried forwardly through the chamber. During this operation the pressure of the hay upon the wire L′ causes the end extending beyond the clamp after the cutting operation to be gradually drawn toward the clamping studs thereby preventing anything more than a nominal waste of this wire end after it is cut. When sufficient pressure is exerted upon the wire end L′ by the hay as it is compressed by the plunger, the clamping device 44 is rotated to the position shown in Fig. 3. It is desirable that this operation of the clamping device occur near the end of the bale forming operation. An intermediate position of the clamping device during its partial rotation is illustrated in Fig. 14. A spring pawl 64 associated with the ratchet teeth 49 provided on the plate 48, operates to prevent the return of the clamping device and otherwise insure its effective operation.

The needle bar 29 is operated by a link or rod connection 65 pivotally secured to the needle bar as at 66. An intermediate connecting rod 67 is connected at one end to the link 66, and at its other end to another connecting rod or link 68. The intermediate rod 67 is supported in guides 69 upon the side of the baler, and the connecting rod 68 is secured to the end of a crank arm 70. The crank arm 70 is secured to the shaft 23 heretofore referred to and is intermittently rotated a single revolution at a time by the clutch and associated mechanism now to be described.

Figure 2:
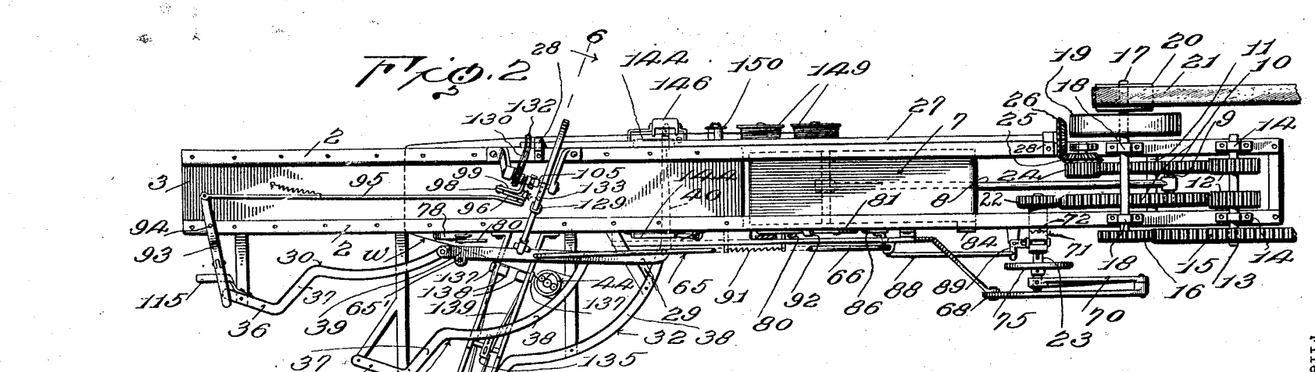
Fig. 2 is a top plan view thereof.

Referring to Figs. 1, 2 and 10 a clutch member 71 is shown slidably mounted upon the shaft 23. This clutch member is slidingly keyed to the said shaft and is moved into and out of engagement with the clutch member 72 by the lever 73. During the time of engagement of the aforesaid clutch members the crank 70 makes one revolution and the needle bar interconnected therewith makes one complete stroke in laying the wire as heretofore described. Upon each revolution of the crank 70, the clutch member 71 is thrown out of engagement with the clutch 72 by means of a roller 74 carried by the lever 73, said roller being adapted to ride upon the smooth surface of a disc 75 and move into the depression 76 upon each revolution of the disc. When the roller enters the depression 76 the lever 73 is moved and the clutch members are disengaged thereby stopping the reciprocation of the needle bar. A spring 77 is provided to keep the roller against the disc 75 and force said roller into the depression 76.

The means for operating the wire laying needle bar by engaging the clutch members just described, after each bale has been formed in the baling chamber, is controlled by the movement of the previously formed and tied bale. Referring to Figs. 1, 12 and 14, the end of the wire of the adjacent previously tied bale is indicated by the letter *w*. This wire is designed to operate a revoluble disc 78 by striking the pin 79 projecting therefrom, thereby causing the disc to rotate in the direction of the arrow shown in Fig. 12. A rod 80 is eccentrically connected to the disc 78 and operates as a crank, the opposite end of said rod being connected to a lever 81 pivoted to the side of the baler at 82.

The end 83 of the said lever is curved as shown and is designed to move downwardly when the disc 78 is moved by the wire *w* into the path of the cam 84 carried by the baling plunger 7. When brought to this position as shown in Fig. 12, the lever bears against a spring finger 85 projecting from the baler and puts said spring under tension. The end 83 of the lever 82 is brought into contact with one arm of a bell crank lever 86 pivoted at 87 to the side of the baler. The opposite end of the bell crank lever is connected to a rod 88 which in turn is connected to one arm of a horizontally disposed bell crank lever 89. The opposite arm of the bell crank 89 is bifurcated and serves to operate the depending arm 90 of the clutch lever 73.

When the lever 81 is set against the lever 86 by the passing of the wire *w* over the pin 79, the cam 84 moving with the reciprocating plunger 7, presses the end 83 of said lever 81 downwardly thereby rocking the bell crank lever 86 and transmitting movement through the rod 88 to the clutch lever 73 for engaging the clutch 71 with the clutch member 72 so as to operate the needle bar. As soon as the cam 84 moving in the reverse direction rides off the top of the curved end 83 of the lever 81, the spring 85 returns the said lever to the position shown in Fig. 13, with the end 83 of the lever above the cam 84 and ready to be lifted by the upper inclined surface 84' thereof to assist in the complete return or rotation of the disc 78 to its normal position with the pin 79 projecting in the path of the wire tied around the succeeding bale. A spring 91 secured to the lever 81 and to the baler at a point beyond the pivotal support of said lever serves to insure the complete return of the disc by pulling same over and around the pivot 82 as will be understood. The upward movement of the lever during this operation is limited by a spring 92 against which the lever 81 strikes to properly set or position the projecting pin 79 for the next operation.

The means for tying or twisting the wire is operated by the needle bar and more especially the extreme forward end of the arm 39. Referring to Figs. 2 and 4 the end of the needle bar is designed to engage one arm of the lever 93 pivoted at 94 to the baler. The opposite end of said lever is connected to a rod 95 which in turn is attached to one arm of a bell crank lever 96 pivotally supported at 97, see Fig. 1. A link or rod 98 is connected to the other arm of the bell crank 96 and is attached at its upper end to a clutch lever 99 pivotally supported at 100 upon an extending bracket 101, see Fig. 11.

A clutch member 102 is slidingly carried by the lever 99 and is designed to engage and disengage a mating clutch member 103 secured to the shaft 104. The sliding clutch member 102 is loosely mounted upon the shaft 104, but is provided with an extending sleeve 105 to which is slidably keyed a pinion 106.

The pinion 106 is arranged for alternate engagement with oppositely disposed rack bars 107 and 108 provided in a reciprocally mounted frame 109. The racks 107 and 108 are provided for imparting to the frame 109 relative upward and downward movement, the same being effected by shifting the pinion 106 by means of oppositely arranged deflecting cams 110 provided at the end of each rack bar. By reference to Fig. 11 it will be seen that as the rack bar 107 with which the pinion is shown as meshed, approaches and reaches its lowermost position the pinion 106 is moved over by the cam 110 into engagement with the rack bar 108 and the movement of the frame 109 is reversed. A similar operation occurs at the opposite end of the frame as will be understood.

The complete movement of the frame 109 consists in one down and up stroke thereof intermittently timed and controlled by the engagement of the clutch members 102 and 103 when the needle bar throws same into said engagement as has been described.

After one complete reciprocation of the frame 109 the clutch members 102 and 103 are automatically disengaged by the ball or roller 111 riding into the notch or depression 112 provided on one side of the frame, as best shown in Fig. 11. A spring 113 secured to the rod 95 and to a pin 114 on the top plate of the baler serves to disengage the clutch members and insure the entrance of the roller 111 into the depression or notch 112.

When the aforesaid clutch members are disengaged, the interconnecting links and levers are reversely operated, and the lever 93 is caused to clear the extreme end of the needle bar by a device now to be described.

A supplemental lever 113' is pivoted to swing in a vertical plane at 114' to the lever 93, and as the needle bar moves the said lever 93 to operate the frame 109 of the tying or twisting mechanism, the aforesaid lever 113 rides upon a cam or elevating track 115. The cam 115 is secured to the guide track 30 and is of a sufficient inclination to assure the lifting of the pivoted end 113' of the lever 93 clear of the end of the needle bar to permit of the reverse movement of said lever and the moving of the end 113' upon the upper surface of the end of the needle bar as will be understood. When the needle bar is subsequently operated the pivoted lever 113' drops to its normal position as the end of said needle bar slides from under it.

The wire twisting end of the tying mechanism is best shown in Figs. 5 to 9 inclusive, and comprises cooperating pinions 116 and 117 revolubly mounted in a head section 118. The head section is in the form of a casing having a flared open end or mouth 119 through which the wires to be twisted are directed to the twisting pinions. The pinions are supported in the side walls of the head or casing and are each provided with a slot 120 adapted to be alined or in register when receiving the wire to be twisted, and subsequently differentially moved to lock said wire therein preparatory to and upon the completion of the revolving of said pinions in unison.

A rack bar 121 is provided in a projecting arm portion 122 of the frame 109, the purpose of this rack bar being to revolve the pinions in unison for twisting the wire. A separated tooth 123 is provided at the lower end of the rack bar 121 for engagement with one of the pinions 116 and another spaced or separated tooth 124 is provided at the upper end of said rack bar for engagement only with the pinion 117.

Oppositely disposed to the rack bar 121 and the separate teeth just mentioned, is a bar having at its lower end a single tooth 125 for engagement with the pinion 117. By reference to Fig. 8 it will be seen that the pinion 116 is differentially movable with relation to the pinion 117 except when both are operatively engaged by the rack bar 121 for revolving in unison. The differential movement of the pinions permits of the locking of the wires in the slotted portions of the gears, it being obvious that the first movement of said pinions 116 and 117 are in reverse directions caused by the opposite rotation of said pinions as the respective teeth 123 and 125 engage the same (see the dotted and full line arrows on Fig. 7).

Figures 6, 7, 8, 9:
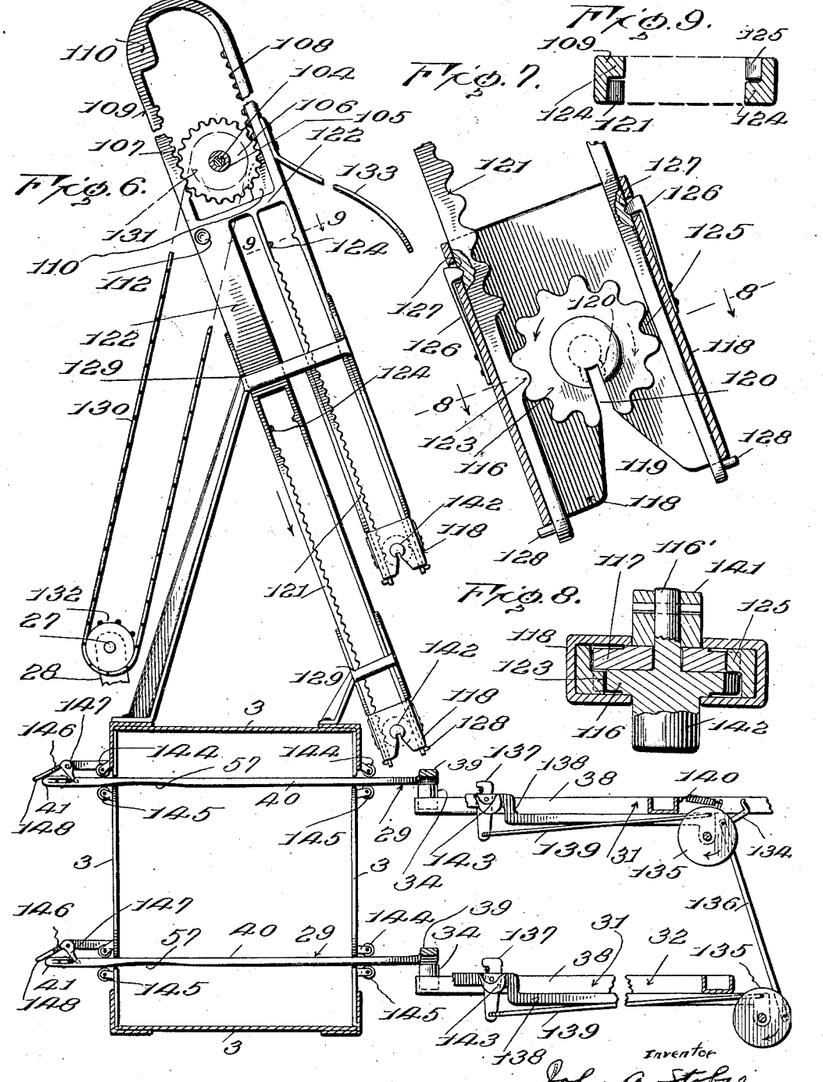
Fig. 6 is an enlarged tranverse sectional view on the line 6—6 of Fig. 2 illustrating the wire tying or twisting mechanism and the associated cutting device controlled thereby.
Fig. 7 is an enlarged sectional view through the lower end of one of the wire twisting devices.
Fig. 8 is a detail horizontal sectional view on the line 8—8 of Fig. 7.
Fig. 9 is a similar sectional view on the line 9—9 of Fig. 6.

A continued movement of the rack bar downwardly rotates the pinions in unison thereby twisting the wires locked in the grooves or slots 120. When the rack bar 121 reaches its lowermost position the pinion 116 runs free of said rack bar 121, but the pinion 117 is turned by the tooth 124 and the slots 120 are brought into register to release the twisted wires therefrom. Spring pawls 126 carried by the head section or casing engage notches 127 in the rack bars at each end thereof and upon the completion of each stroke. Pins 128 are provided upon the rack bars and retain the twisting head section when lifted out of operative position as shown in Fig. 6. Guides 129 encase the projecting arm portions 122, and direct the tying heads upon the wires to be twisted.

There are two projecting arm portions 122 each provided with a tying head and associated operating mechanism, each operable upon the separate baling wires as will be understood.

Likewise two needle bars 29 are provided for laying the upper and lower baling wires, both of said needle bars being operated in unison through the yoke and pin connection 65' joining the needle operating rods or links 65, as will be understood.

Power is transmitted to the tying or twisting mechanism through the sprocket chain 130 passing around the sprocket wheel 131 pinned to the shaft 104, and the sprocket wheel 132 keyed to the driving shaft 27 heretofore referred to.

The cutting device is operated by the tying means, a projecting arm 133 being arranged to engage an extending pin 134 carried by one of the crank discs 135 which move the cutting knives, as best shown in Fig. 6. As both of the cutting devices are similar and interconnected for operation in unison by the link 136, a description of one will suffice.

The cutting knife 137 is pivotally supported upon a post 138, and an operating link 139 connects the lower end of said knife with the crank disc 135. As the disc is moved in the direction of the arrow shown thereon in Fig. 6, the knife is rocked and the wire severed against the edge of the post 138 as will be understood. A spring 140 returns the knife to normal position when the operating arm 133 is retracted upon the reverse or upward movement of the twisting rack bar.

The portions of the wires which are twisted are laid substantially parallel as indicated by the letter P in Fig. 4, the said wires lying against the knives 137 as shown. The ends of the wires which are cut are designated by the numeral C in Fig. 4. The wires are not cut until after the twisting or tying operation. During the twisting operation the hubs 141 and 142 of the respective twisting pinions are supported in cupped portions 143 which latter serve to steady and form bearings for the rotating pinions. The hub 142 is preferably formed integral with the pinion 116, and the hub 141 is pinned to the reduced shaft portion 116' of said pinion, the pinion 117 being loosely mounted upon the shaft 116' as best shown in Fig. 8.

The needle bar 29 is preferably guided between upper and lower rollers 144 and 145 provided upon each side of the baling press, (see Fig. 6), and a wire engaging device 146 is arranged to cooperate with the wire engaging end 41 of the said needle bar. This device is in the form of a pivoted lever one arm 147 of which presses down upon and pushes the wire in the groove and pin connection 42, when the other end 148 of said device is elevated by the end of the needle bar striking same.

The wire is fed from respective reel or spools 149 suitably supported and tensioned upon one side of the baler as shown in Fig. 2, the tension device being indicated by the numeral 150.

The operation is as follows: The material is continuously fed to the baler, by a material handling mechanism of a type set forth in a companion application filed Apr. 20, 1921 and bearing Serial Number 463,095, and if desired may be fed and cut into separate units by a feeding and cutting device disclosed in an application filed by me April 20, 1921 and bearing Serial Number 463,094. It will be understood, however, that other feeding devices may be used.

Upon the complete forming and tying of each bale, the said preceding bale is used as the abutment against which the material is compressed by the plunger 7 for forming the next bale. The wire loop L' hereinbefore referred to constitutes the forward end of the baling wire, and as the preceding tied bale and more particularly the end wire w thereof passes over the pin 79, the lever 81 is set for actuation by the cam 84 movable with the plunger 7. When the cam 84 strikes the lever 81 and forces same downwardly the clutching members 71 and 72 are engaged and power is transmitted from the gear 10 of the baler driving mechanism to the needle bar 29 which moves from its outermost position in its tracks through the baling chamber and engages the wire while moving straight along the opposite side of the press. The loop L' is formed in said wire as the needle returns to its initial position, one side L' of the loop being pressed under the lip and between the clamping studs, and the other side of said loop L being laid substantially parallel with the end of the wire which in the preceding operation formed the side L' of the loop L. By laying the wire thus and locating the tying mechanism between the ends of the bale and suitably spaced therefrom, a relatively slack wire is applied to the bale and the joint is made at a highly desirable point along the side of the bale.

As the needle bar 29 finishes its complete stroke the operating clutch therefor is disengaged as before explained, the end of said needle bar however, strikes the end of the lever 93 as it completes its stroke, and through the interconnected links and lever hereinbefore described, throws the clutch members 102 and 103 into engagement for operating the tying mechanism to twist the parallel wires indicated at P in Fig. 4.

The frame 109 is now moved downwardly, the twisting pinions first gripping and then turning the wires into a twisted joint as will be understood. Upon the completion of the twisting operation the respective ends C of the wires (see Fig. 4) are cut. The arm 133 strikes the pin 134 and operates the cutting knives as described hereinbefore.

The frame 109 is returned to its uppermost position and the clutch for operating the same is automatically disengaged by the ball 111 moving into the depression 112. The twisting pinions are returned to their normal positions clear of the wire laying mechanism during this return movement of the frame 109.

Advantages of simplicity of operation and comparative rapidity of produced bales are effected by the foregoing automatic mechanism, it being apparent that various changes may be made to the above disclosures as properly fall within the scope of this invention.

I claim:

1. In a baling press, the combination with a baling chamber, of a plunger for compressing the material against the preceding formed bales, the latter forming a movable abutment, and means including a needle movable transversely through the baling chamber and longitudinally thereof upon the outside of said chamber for applying a relatively slack wire around the bale while compressed in the baling chamber, said slack permitting the expansion of said compressed bale after it leaves the baling chamber.

2. In a baling press, the combination with a baling chamber, of a plunger for compressing the material against the preceding formed bales which latter form the only abutment of said press, means including a transversely and longitudinally movable member for applying a relatively slack wire around said compressed bale while in the baling chamber, said slack permitting the expansion of said compressed bale after it leaves the baling chamber, and means for tying said wire at a point intermediate the ends of the bale and spaced from the side of the press.

3. In a baling press the combination with a baling chamber of means including a long and relatively immovable support for retaining a plurality of formed bales in abutted relation adjacent said baling chamber, a plunger for compressing the material against the last formed bale, and means for applying a portion of a slack wire around said bale, and a needle for laying the remaining portion of said wire, said needle being movable transversely of the baling chamber and longitudinally of the press upon the outside of said chamber.

4. In a baling press the combination with a baling chamber of means including a long and relatively fixed support for retaining a plurality of formed bales in abutted relation adjacent said baling chamber, a plunger for compressing the material against the last formed bale, means for applying a portion of slack wire around said bale, and a needle for forming a loop in the wire, one side of said loop forming the remaining portion of the tying wire, and the other side of said loop constituting a portion of the wire for the succeeding bale to be tied, said needle being movable transversely of the baling chamber and longitudinally of the press upon the outside of said chamber.

5. In a baling press the combination with a baling chamber of means including a relatively long and stationary discharge end for supporting a plurality of formed and tied bales in abutted relation adjacent said baling chamber, a plunger for compressing the material against the last formed bale, means for successively applying a portion of a slack wire around each of said bales, a needle for laying the remainder of said wire with a portion thereof substantially parallel with the end of the first mentioned portion of the wire, said needle being movably transversely of the baling-chamber and longitudinally of the press upon the outside of said chamber, and means for tying said parallel portions of the wire together.

6. The combination of a baling press with a movable wire clamping device having a plurality of studs, a needle for laying one side of a wire loop between two of said studs, said wire acting to rotate the clamping device and means for holding said device in the position to which it is moved.

7. The combination of a baling press with a movable wire clamping device consisting of a central and diametrically arranged cam studs for holding a wire against the central stud, means for laying a wire between two of said studs and means including the aforesaid wire for rotating said cam studs.

8. The combination of a baling press with a movable wire clamping device consisting of a central stud and a vertically movable cam stud adjacent thereto, means including a wire laying needle bar for lifting said cam stud and inserting a wire between the said studs, and means for lowering said cam stud.

9. The combination of a baling press with a movable wire clamping device consisting of a central stud and a vertically revolubly mounted cam stud, a lip provided on said cam stud and a wire laying needle bar adapted to engage said lip and revolve the cam stud for inserting a wire between the said studs.

10. The combination of a baling press with a movable wire clamping device consisting of a relatively stationary stud, a cam stud arranged adjacent said stationary stud and having a threaded portion for lifting the stud, and a wire laying needle bar adapted to engage the cam stud and rotate the same whereby the wire is positioned between said studs, and a spring for lowering said cam stud to clamp the wire against the aforesaid stationary stud.

11. The combination with a baling press having a baling chamber of a wire laying needle, and guide tracks for directing the path of travel of said needle, said guide track being arranged to move the needle transversely through said baling chamber, and substantially parallel along the outer side thereof.

12. The combination with a baling press having a baling chamber of a wire clamping device spaced from said chamber and arranged intermediate the ends thereof, a wire laying needle, and guide tracks for the needle, said guide tracks being arranged to move the needle transversely through the baling chamber, and angularly therefrom across the wire clamping means and finally in a plane substantially parallel with and upon the outside of the baling chamber.

13. The combination with a baling press of means for laying the end portions of the wire to be tied in substantially parallel relation with the bale to be tied and to each other, and a tying mechanism for twisting said wires while in parallel relation, said tying mechanism being mounted above said needle and adapted to be lowered upon said wires for twisting the same together.

14. The combination with a baling press of means for laying the end portions of the wire to be tied in substantially parallel relation with each other at the side of the bale, and a tying mechanism comprising cooperating pinions having registering slots for receiving the wires to be twisted, means for locking said wires in the pinions, and means for revolving said pinions.

15. The combination with a baling press of means for laying the end portions of the wire to be tied in substantially parallel relation with each other at the side of the bale, a tying mechanism including cooperating twisting pinions having registering slots therein to receive the wires to be twisted, means for locking said wires in the slots, means for revolving said pinions, and means for releasing the twisted wires from the aforesaid slots.

16. The combination with a baling press of means for laying the end portions of the wire to be tied alongside each other, means including cooperating pinions for twisting the said end portions, means for lowering said pinions upon the end portions of the wire, means for revolubly supporting the pinions when engaging the wires and during the twisting operation, and means for revolving the pinions.

17. The combination with a baling press of means for laying the end portions of the wire to be tied alongside each other at a point intermediate the ends of the bale and spaced therefrom, means including slotted pinions for twisting the end portions of said wire, means for locking said wire in said slotted pinions and means for cutting the extending untwisted ends of the wire after the twisting operation and before the slotted pinions have unlocked and have moved away from the wire.

18. The combination with a baling press of means for laying a slack wire around the compressed material with the portions to be tied in substantially parallel relation intermediate the ends of the bale and spaced from the side thereof, means for tying said wire, and means for cutting the wire, said cutting means being operated by the aforesaid tying means.

19. The combination with a baling press of means for laying a slack wire around the compressed material with the portions to be tied in substansially parallel relation intermediate the ends of the bale, means for tying said wire, means being operated by the wire laying means, and means for cutting the wire.

20. The combination with a baling press for forming successive bales of material, means for laying a slack wire around each bale with the portions to be tied in substantially parallel relation intermediate the ends of the bale being tied, and means for tying the wire, said means being operated by the wire laying means aforesaid, said wire laying means being operated by the wires of the preceding tied bale.

21. The combination of a baling press for forming successive bales of material with a compressing plunger, means for operating said plunger, an intermittently operated wire laying means actuated by said plunger, means including a clutch interposed between said wire laying and plunger operating means, said clutch being operated by the wire of the preceding tied bale, a tying mechanism controlled by said wire laying means, a cutting device operated by said tying mechanism.

22. The combination of a baling press for forming successive bales of material with a compressing plunger, means for operating said plunger, a wire laying means, means including a clutch interposed between the said wire laying and plunger operating means for intermittently controlling the operation of said wire laying means, a tying mechanism controlled by said wire laying means, and a clutch interposed between the tying mechanism and the operating means of the plunger effecting the intermittent operation of the tying mechanism.

23. The combination of a baling press for forming successive bales of material with a compressing plunger, means for operating said plunger, a wire laying means, means including a clutch interposed between the said wire laying and plunger operating means for intermittently controlling the operation of said wire laying means, a tying mechanism controlled by said wire laying means, a cutting device operated by said tying mechanism, a lever for operating the aforesaid clutch, said lever being moved into position for actuation by the plunger, by the wire of the preceding tied bale.

24. The combination with a baling press for forming successive bales of material, of a compressing plunger, means for operating said plunger, an intermittently operated wire laying device, a tying mechanism, means for controlling the intermittent operation of said wire laying device, said means being moved into position for actuation by the plunger, by the wire of the preceding tied bale.

In testimony whereof I affix my signature.

JOHN A. STOBIE.